(12) United States Patent
Subasic (10) Patent No.: US 11,252,581 B2
(45) Date of Patent: Feb. 15, 2022

(54) BI-DIRECTIONAL HIGH POWER USER EQUIPMENT

(71) Applicant: REDLINE COMMUNICATIONS INC., Markham (CA)

(72) Inventor: Bojan Subasic, Mississauga (CA)

(73) Assignee: Redline Communications Inc., Markham (CA)

( * ) Notice: Subject to any disclaimer, the term of this patent is extended or adjusted under 35 U.S.C. 154(b) by 66 days.

(21) Appl. No.: 15/961,366

(22) Filed: Apr. 24, 2018

(65) Prior Publication Data

US 2019/0327617 A1 Oct. 24, 2019

(51) Int. Cl.
*H04W 16/28* (2009.01)
*H04B 1/04* (2006.01)
*H04W 88/06* (2009.01)
*H04B 17/11* (2015.01)
*H04B 17/21* (2015.01)
*H04B 7/0413* (2017.01)

(52) U.S. Cl.
CPC .......... *H04W 16/28* (2013.01); *H04B 1/0475* (2013.01); *H04B 7/0413* (2013.01); *H04B 17/11* (2015.01); *H04B 17/21* (2015.01); *H04W 88/06* (2013.01)

(58) Field of Classification Search
None
See application file for complete search history.

(56) References Cited

U.S. PATENT DOCUMENTS

| 8,461,898 | B2 | 6/2013 | Granger-Jones et al. |
| 9,992,751 | B1* | 6/2018 | Manchanda ........ H04W 52/243 |
| 2003/0223480 | A1* | 12/2003 | Cafarella ................. H04B 1/30 |
| | | | 375/219 |
| 2006/0006986 | A1* | 1/2006 | Gravelle .............. G06K 7/0008 |
| | | | 340/10.3 |
| 2008/0181328 | A1 | 7/2008 | Harel et al. |
| 2010/0197295 | A1* | 8/2010 | Horangic .............. H04W 48/02 |
| | | | 455/422.1 |

(Continued)

FOREIGN PATENT DOCUMENTS

WO 2017031336 A1 2/2017

OTHER PUBLICATIONS

Search Report and Written Opinion from corresponding PCT application No. PCT/2019/050519.

*Primary Examiner* — Shripal K Khajuria
(74) *Attorney, Agent, or Firm* — Stratford Group Ltd.

(57) ABSTRACT

A wireless device comprises a transmitter chain receiving a transmit signal from a UE. The transmitter chain amplifies the transmit signal to produce an amplified transmit signal that is transmitted to a BS. A receiver chain receives a receive signal from the BS. The receiver chain amplifies the receive signal to produce an amplified receive signal which is transmitted to the UE. A second receiver chain receives a second receive signal from the BS. The second receiver chain amplifies the second receive signal to produce a second amplified receive signal that is transmitted to the UE. The gain of the transmitter chain, the receive gain and the second receive chain are balanced. The transmitter chain, the receiver chain, and the second receiver chain each comprise a transmit variable attenuator, with gains set by a controller.

18 Claims, 7 Drawing Sheets

(56) References Cited

U.S. PATENT DOCUMENTS

2010/0265851 A1* 10/2010 Shahar ................ H04W 84/042
                                                  370/278
2014/0329554 A1* 11/2014 Froberg Olsson ..........................
                                                  H04W 72/0473
                                                  455/522
2018/0124784 A1*  5/2018 Kumar .............. H04W 52/0206
2018/0359077 A1* 12/2018 Haine .................. H04B 7/0404
2019/0207669 A1*  7/2019 Cook ..................... H04B 17/27

* cited by examiner

Figure 7

BI-DIRECTIONAL HIGH POWER USER EQUIPMENT

FIELD OF THE INVENTION

The present invention relates to wireless communications in remote areas and more particularly to the use of High Power User Equipment (HPUE) to extend the reach of cellular user equipment.

BACKGROUND OF THE INVENTION

Wireless communications are ubiquitous in our society and are used for a variety of personal and commercial uses. Wi-Fi networks are common in dwellings, buildings, public transportation, and even sprawling educational and commercial campuses. Cellular communications such as LTE is used over wider areas; both urban and rural. However, the range of coverage from cellular base stations is limited and at a certain distance from the base station communication throughput first degrades and then stops.

A number of solutions are in use or have been proposed to increase the range of LTE communications without requiring a large investment in additional infrastructure. One solution is to use an HPUE (High Power User Equipment) device that is part of Release 11 of the LTE standard. Regular UE (User Equipment) devices are restricted to a maximum output power of 23 dBm while HPUE devices are allowed to transmit up to 31 dBm. HPUE devices use band 14 and allow for better cellular network coverage in rural and isolated areas.

Practical experience reveals that real world performance may not match theoretical performance. In particular uplink (UL) as well as downlink (DL) performance is limited by the difficulty of designing RF filters for challenging sub-band spacing and required bandwidth.

A number of other solutions exist to allow regular UE to operate as HPUE using RF booster amplifiers to boost signals and extend the range of wireless communications. However, these devices tend to offer sub-optimal performance when used in modern 4G communications networks due to problems with linearity, temperature stability, and unidirectional amplification. Furthermore, these RF booster amplifiers often fail to support the power control loops in the UL direction which can degrade performance. Additionally, these RF booster amplifiers do not adequately support multiple-input and multiple output (MIMO) applications in the DL direction.

There exists a need for an RF booster amplifier that supports existing UE devices and solves the deficiencies of the present applications.

Other aspects and features of the present invention will become apparent to those ordinarily skilled in the art upon review of the following description of specific embodiments of the invention in conjunction with the accompanying figures.

SUMMARY OF THE INVENTION

A major embodiment of the invention includes a wireless device comprising a transmitter chain receiving a transmit signal from a UE. The transmitter chain amplifies the transmit signal by a transmit gain to produce an amplified transmit signal, the amplified transmit signal then being transmitted to a BS. A receiver chain receives a receive signal from the BS. The receiver chain amplifies the receive signal by a receive gain to produce an amplified receive signal. The amplified receive signal is transmitted to the UE. The transmit gain and the receive gain are balanced.

In a further embodiment, the transmitter chain comprises a transmit variable attenuator and the receive chain comprises a receive variable attenuator. The wireless device further comprises a controller controlling the transmit variable attenuator and the receive variable attenuator. The transmit variable attenuator determines the transmit gain and the receive variable attenuator determines the receive gain.

In some embodiments, the transmit signal and the amplified receive signal utilize a UE shared antenna and the amplified transmit signal and the receive signal utilize a BS shared antenna.

In further embodiments, the wireless device further comprises a second receiver chain receiving a second receive signal from the BS. The second receiver chain amplifies the second receive signal by a second receive gain to produce a second amplified receive signal. The second amplified receive signal is transmitted to the UE. The transmit gain and the second receive gain are balanced.

In some embodiments, the controller utilizes temperature compensated settings to control the transmit variable attenuator and the receive variable attenuator.

In other embodiments, the UE operates on LTE bands 14, 17, or 28.

In other embodiments, the wireless device is an 3GPP class 1 compliant device and the UE is a 3GPP class 3 device.

In some embodiments, the wireless device utilizes a MIMO antenna to communicate with the BS.

In some embodiments, the wireless device further comprises a second transmitter chain receiving a second transmit signal from the UE. The second transmitter chain amplifies the second transmit signal by a second transmit gain to produce a second amplified transmit signal. The second amplified transmit signal is transmitted to the BS. The transmit gain and the second transmit gain are balanced.

A second major embodiment of the invention includes a method of extending the reach of a UE in a wireless communication network comprising a transmitter chain receiving a transmit signal from a UE. The transmitter chain amplifies the transmit signal by a transmit gain to produce an amplified transmit signal. The amplified transmit signal is transmitted to a BS. A receiver chain receives a receive signal from the BS. The receiver chain amplifies the receive signal by a receive gain to produce an amplified receive signal. The amplified receive signal is transmitted to the UE. The transmit gain and the receive gain are balanced.

In further embodiment, the transmitter chain comprises a transmit variable attenuator and the receive chain comprises a receive variable attenuator. The wireless device further comprises a controller. The controller controls the transmit variable attenuator and the receive variable attenuator. The transmit variable attenuator determines the transmit gain. The receive variable attenuator determines the receive gain.

Further embodiments, comprise a second receiver chain receiving a second receive signal from the BS. The second receiver chain amplifies the second receive signal by a second receive gain to produce a second amplified receive signal. The second amplified receive signal is transmitted to the UE. The transmit gain and the second receive gain are balanced.

Another embodiment further comprises a second transmitter chain receiving a second transmit signal from the UE. The second transmitter chain amplifies the second transmit signal by a second transmit gain to produce a second amplified transmit signal. The second amplified transmit signal is transmitted to the BS. The transmit gain and the second transmit gain are balanced.

In a further embodiment, the MIMO antenna is a smart antenna and a power level of the transmit signal being used to control a configuration of the smart antenna. In another embodiment, the MIMO antenna is a smart antenna and a power indicator of the smart antenna being used to control a configuration of the smart antenna.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is direct to an HPUE device that may be used to extend the reach of UE devices in a 4G Long-Term Evolution (LTE) network. Embodiments of the invention may be used with existing UE devices and provide balanced, bi-directional amplification for UL and DL transmissions. Embodiments of the invention also allow the LTE open and closed loop power control, where the UE adjusts its transmission power to adjust for path loss between the UE and the base station (BS), to operate even with the HPUE inserted between the UE and the BS.

Embodiments of the invention provide symmetric gain in both the UL and DL directions. The HPUE comprises a micro controller to adjust transmitted power levels and is able to adjust the gain in both the UL and DL directions. Gain may be compensated for temperature, manufacturing variations, and other conditions using calibration coefficients that may be determined during manufacture and be updated in the field or as part of maintenance procedures.

Embodiments of the invention include support for MIMO configurations with multiple gain paths, or chains, in both the UL and DL direction. An exemplary embodiment includes a DL (Rx) chain and a UL (Tx) chain using one Rx/Tx antenna together with another DL (Rx) chain using a second antenna. Other embodiments include a 2×2 configuration with two UL and two DL chains, 4×4, and may be matched to any other MIMO combination.

Embodiments support any compliant LTE radio module, LTE mobile router, or device without the need for SW changes or recalibration, in effect turning any UE into a HPUE device. LTE bands such as B14, B17, and B28 may be supported.

Figure 1:
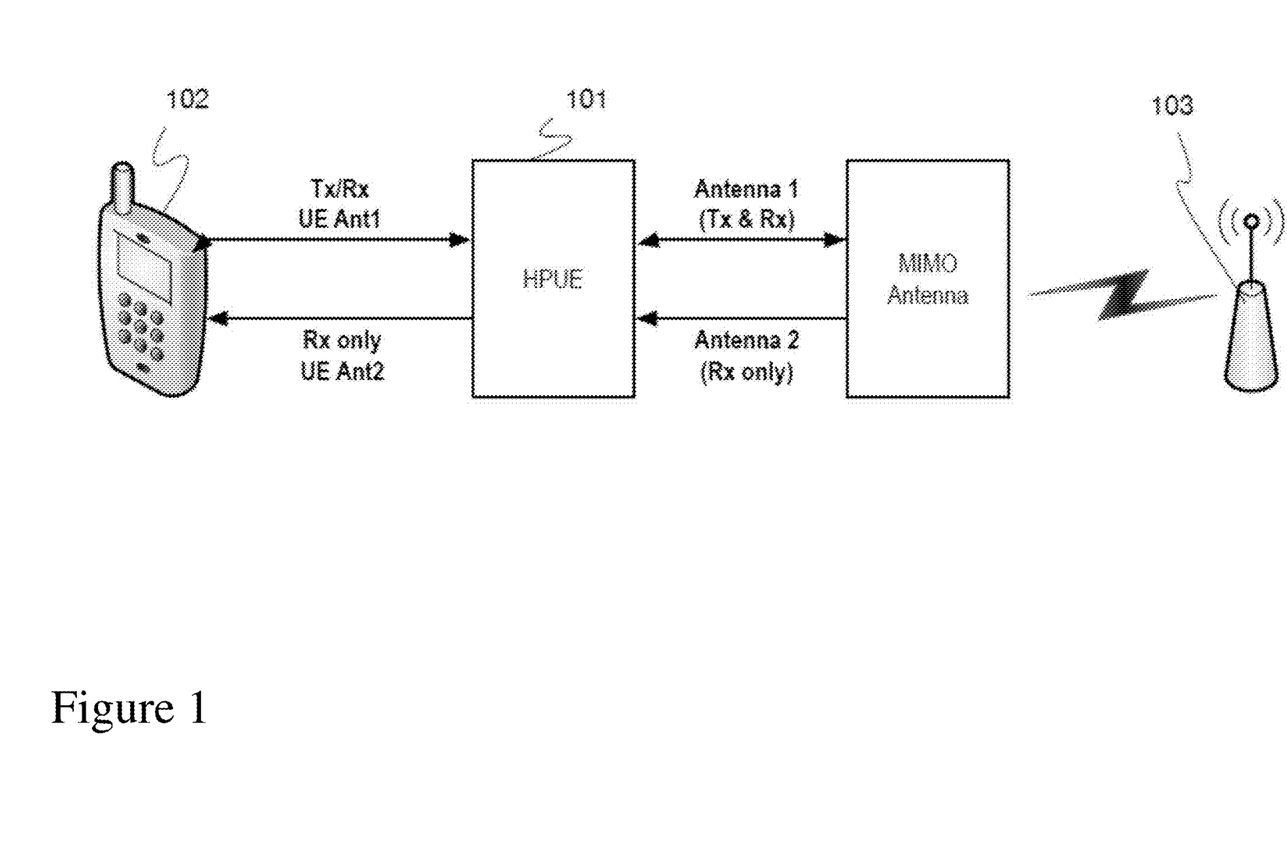
FIG. 1 depicts a block diagram of a system comprising a UE, an HPUE, and a cellular BS.

FIG. 1 illustrates the use of an HPUE 101 device in a cellular communications system. A Class 3 UE 102 is co-located with the HPUE device. The Class 3 UE 102 can transmit using a maximum $P_{out}$ of 23 dBm. The HPUE 101 is a Class 1 device and can transmit using a maximum $P_{out}$ of 31 dBm. Both the UE 102 and the HPUE 101 use MIMO antennas with one Tx chain and two Rx chains. The UE 101 and HPUE 102 are connected using short RF cables. The HPUE 101 is connected to its own MIMO antenna, and transmits and receives data with a BS 103. The antenna may also be an omnidirectional antenna, a directional antenna, an electrical beam steering antenna, a mechanical beam steering antenna, or other suitable antenna. The HPUE 101 has a balanced gain in both the UL and DL directions and open and closed loop power control is used between the UE device 102 and the BS 103.

Figure 2:
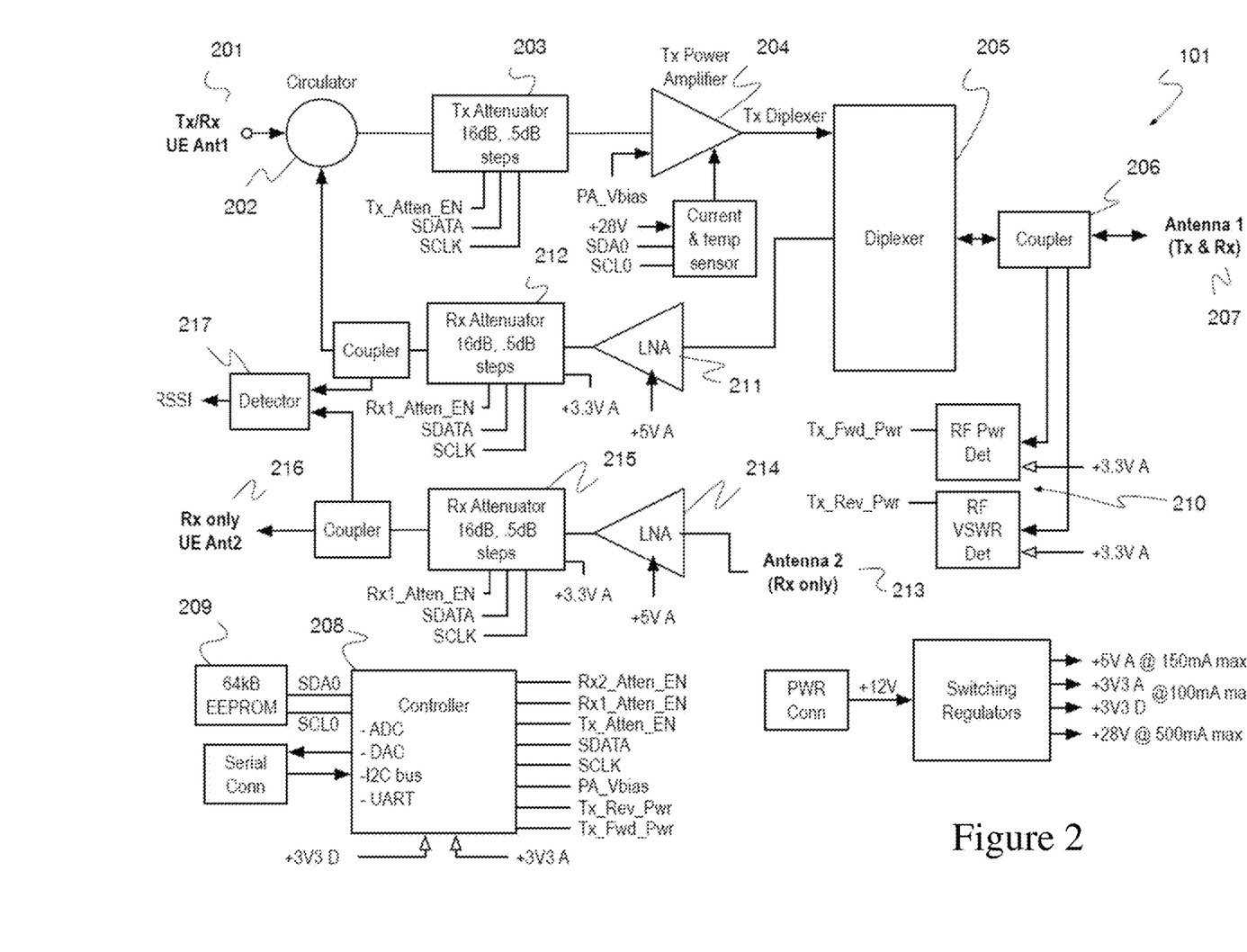
FIG. 2 depicts a block diagram of a HPUE system supporting embodiments of the invention.

FIG. 2 illustrates an exemplary embodiment in the form of an analog RF front end (RFFE) HPUE device 101. A transmit signal is received from a co-located UE 102 through the Tx/Rx UE Ant1 201. The signal passes through a circulator 202 and is input to a digitally programmable RF attenuator 203. The attenuated signal is then input into a Tx RF power amplifier 204 or transistor and into the input port of a diplexer 205. The combination of the programmable attenuator 203 and the power amplifier 204 sets the output power of the HPUE 101 and is compliant with the LTE 3rd Generation Partnership Project (3GPP) standards including maximum Pout, spectrum mask requirements, etc. The Tx signal exits the diplexer's 205 bi-directional port, passes through a coupler 206 and then to Antenna 1 207, which is used for both Tx and Rx functions. The attenuation of the RF attenuator 203 is controlled by a micro controller 208 executing firmware contained in an EEPROM 209 or similar non-volatile memory. The Tx RF power amplifier 204 is supplied with a bias voltage and is controlled for current and temperature via the micro controller 208. The RF power thorough the coupler 206 is measured by RF power detectors 210 and input into the micro controller 208. The micro controller may be accessed for control and communications by external devices through a serial port or similar means.

Receive chains may include a coupler on each of the outputs of the Rx Attenuators 212 215. The couplers allow a detector 217 to perform RSSI (relative received signal strength) level measurements on received signals in the DL direction. The RSSI level gives an indication of the power levels being received in the DL direction. These values are read by the micro controller 208 and may be used to set the variable attenuator gains 204 212 215 and to balance out the UL and DL chain gains. In the case where the antenna may be steered or controlled, such as in the case or a beam steering antenna, mechanical or electrical, embodiments may incorporate an interface to control motor or electrical beam position that is controlled by the micro controller. Antenna control parameters may also be configured, especially in the case of the HPUE 101 being in a fixed position and direction relative to the BS 103. By changing beam position continuously in small increments, basically sweeping beam left/right, RSSI vs beam angle statistic can be obtained and it is possible to point the antenna beam in an optimized direction to maintain and improve communication range.

A first Rx signal is received by the Antenna 1 207 and input to the coupler 206 and into the bidirectional port of the diplexer 205. The Rx signal exits the output port of the diplexer 205 and enters a low noise RF amplifier (LNA) 211 before entering another digitally programmable RF attenuator 212. The attenuated Rx signal is then combined with the TX signal in the circulator 202 and is then sent to the Rx/Rx UE Ant1 port 201. The attenuation of the digitally programmable RF attenuator 212 is controlled by the micro controller 208. The gain of the LNA 211 and digital attenuator 212 is matched to the gain of the Tx RF power amplifier 204 and Tx digitally programmable RF attenuator 203 to product balanced gain in both Tx chain and Rx chains.

A second Rx signal is received by the Antenna 2 213, which only receives signals. This second Rx signal enters a second low noise RF amplifier (LNA) 214 before entering a third digitally programmable RF attenuator 215. This second Rx signal is then sent to the Rx only UE Ant 2 port 216. The attenuation of the second digitally programmable RF attenuator 215 is controlled by the micro controller 208 so that the gain of the second LNA 214 plus the second digitally programmable RF attenuator 215 produces a second Rx chain that has a gain balanced with the Tx chain and Rx chain, above. Though both Rx chain LNAs 211 214 may have the same nominal gain, manufacturing variations may make them different enough that different attenuator 212 215 settings would be used to produce the same overall gain or loss in the Rx chains. In the case of an HPUE 101 with multiple Tx chains, similar calibration would be done to ensure all Tx and Rx chains are balanced with respect to each other.

The gains of the three digitally programmable RF attenuators is set using coefficients configured in the HPUE 101 and read by the micro controller based on environmental conditions such as temperature and power levels. These coefficients may also be calculated or adjusted dynamically based on detected RF power levels, antenna type, UE type, BS type, distance to BS, and path loss to the BS 103.

Figure 3:
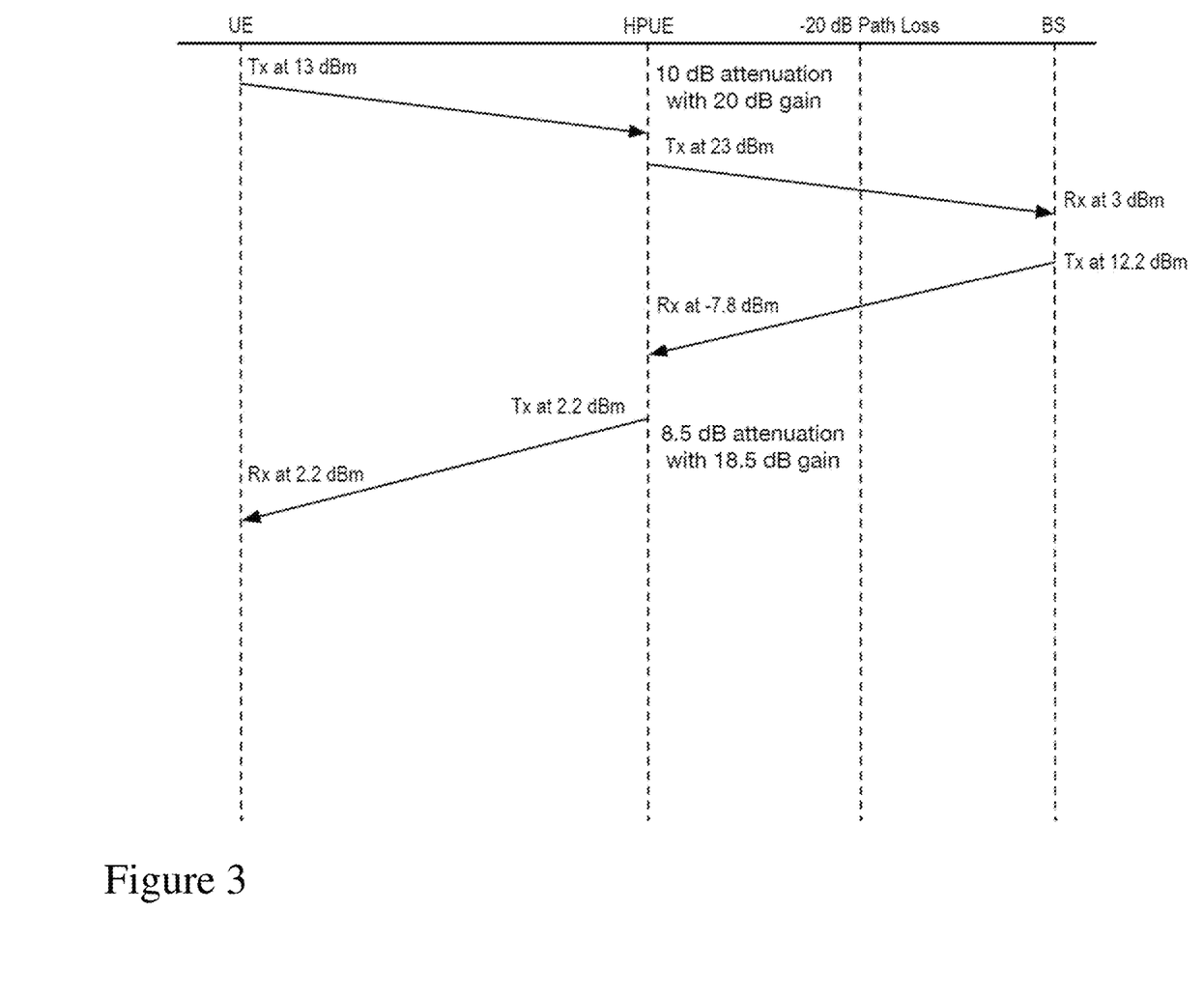
FIG. 3 depicts transmit and receive levels in a wireless system comprising embodiments of the invention where the UE does not transmit at maximum power level.

FIG. 3 illustrates how the loop power control operates in the system of FIG. 1 when the UE 102 transmits at a power level less than maximum. It is assumed that the path loss to the BS 103 is 20 dB, that the HPUE 101 has a Tx power amplifier gain of 20 dB and that the Rx LNAs have a gain of 18.5 dB. For simplicity sake, it is assumed that any other loss in the system, such as in the circulator 202, diplexer 205, coupler 206, etc., is negligible, though this would be taken into account in real world implementations.

The UE 102 transmits at a level of 13 dBm. The UE 102 is coupled to the HPUE 101 though RF cables. The HPUE Tx chain is configured by the micro controller 208 so that the digitally programmable RF attenuator 203 has 10 dB of attenuation, which combined with the 20 dB gain of the Tx power amplifier 204 to obtain a Tx chain gain of 10 dB. This produces a Tx signal with a power level of 23 dBm. After the 20 dB path loss, the BS 103 receives the signal at a power level of 3 dBm. The BS 103 transmits an Rx signal at a level of 12.2 dBm. After the 20 dB path loss, the HPUE 101 receives the Rx signal at a power level of −7.8 dBm. The LNA 211 214 of each Rx chain has a nominal gain of 18.5 dB so each Rx digitally programmable attenuators 212 215 is configured to 8.5 dB of attenuation to obtain Rx chain gains of 10 dB, matching the Tx chain gain. The Rx signal is transmitted to the UE 102 at a power level of 2.2 dBm. The UE 102 sees a path loss of 10 dB, not 20 dB and chooses an Tx output power based on a 10 dB path loss to the BS. As the HPUE 101 adds a 10 dB gain in its Tx chain, this system performs and the open and closed loop power control works as if the HPUE 101 was not present.

Figure 4:
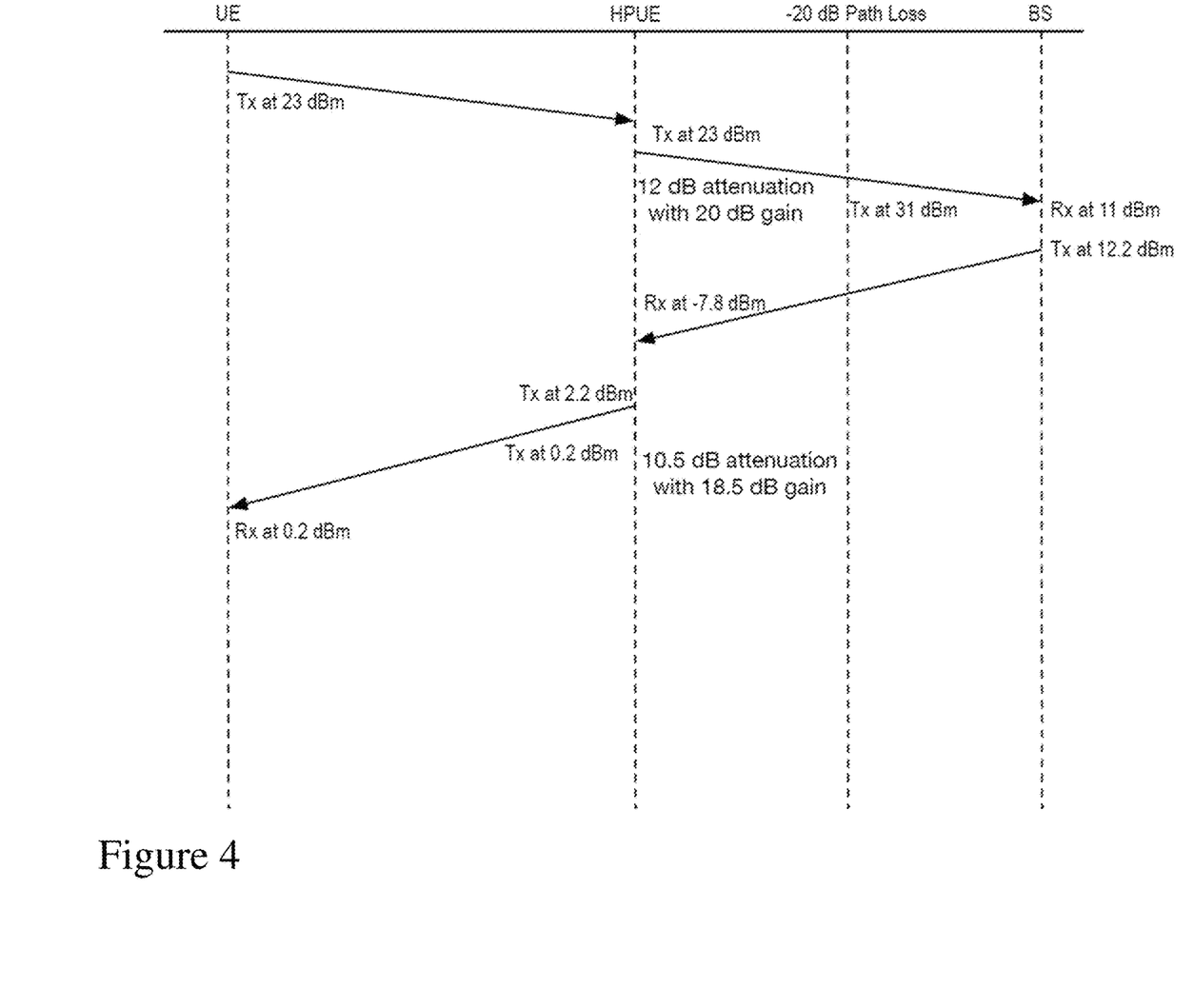
FIG. 4 depicts transmit and receive levels in a wireless system comprising embodiments of the invention where the UE transmits at maximum power level.

FIG. 4 illustrates how the loop power control operates in the system of FIG. 1 when the UE 102 transmits at a maximum power level for a Class 3 device, 23 dBm. It is assumed that the path loss to the BS 103 is 20 dB, that the HPUE 101 has a Tx power amplifier 204 gain of 20 dB and that the Rx LNAs 211 214 have a gain of 18.5 dB. For simplicity sake, it is assumed that any other loss in the system, such as in the circulator 202, diplexer 205, coupler 206, etc., is negligible, though this would be taken into account in real world implementations.

The UE 102 transmits at a level of 23 dBm. The UE 102 is coupled to the HPUE 101 though RF cables. The HPUE 101 Tx chain is configured by the micro controller 208 so that the digitally programmable RF attenuator 203 combined with the 20 dB gain of the Tx power amplifier 204 produces a Tx power level of 31 dBm, the maximum for a Class 1 device. In this case, the attenuator 203 is set to 12 dB attenuation to produce a Tx chain gain of 8 dB. This produces a Tx signal with a power level of 31 dBm. After the 20 dB path loss, the BS 103 receives the signal at a power level of 11 dBm. The BS 103 transmits an Rx signal at a level of 12.2 dBm. After the 20 dB path loss, the HPUE 101 receives the Rx signal at a power level of −7.8 dBm. The LNA 211 214 of each Rx chain has a nominal gain of 18.5 dB but each Rx digitally programmable attenuators 212 215 is configured to 10.5 dB of attenuation to obtain Rx chain gains of 8 dB, matching the Tx chain gain. The Rx signal is transmitted to the UE 102 at a power level of 0.2 dBm. The UE 102 sees a path loss of 10 dB, not 20 dB and chooses an Tx output power based on a 10 dB path loss to the BS 103. As the HPUE 101 adds a 10 dB gain in its Tx chain, this system performs and the open and closed loop power control works as if the HPUE 101 was not present. The gain of the HPUE 101 is transparent to the UE 102 yet the system of the UE 102 and HPUE 101 operates together as a Class 1, HPUE device.

Figure 5:
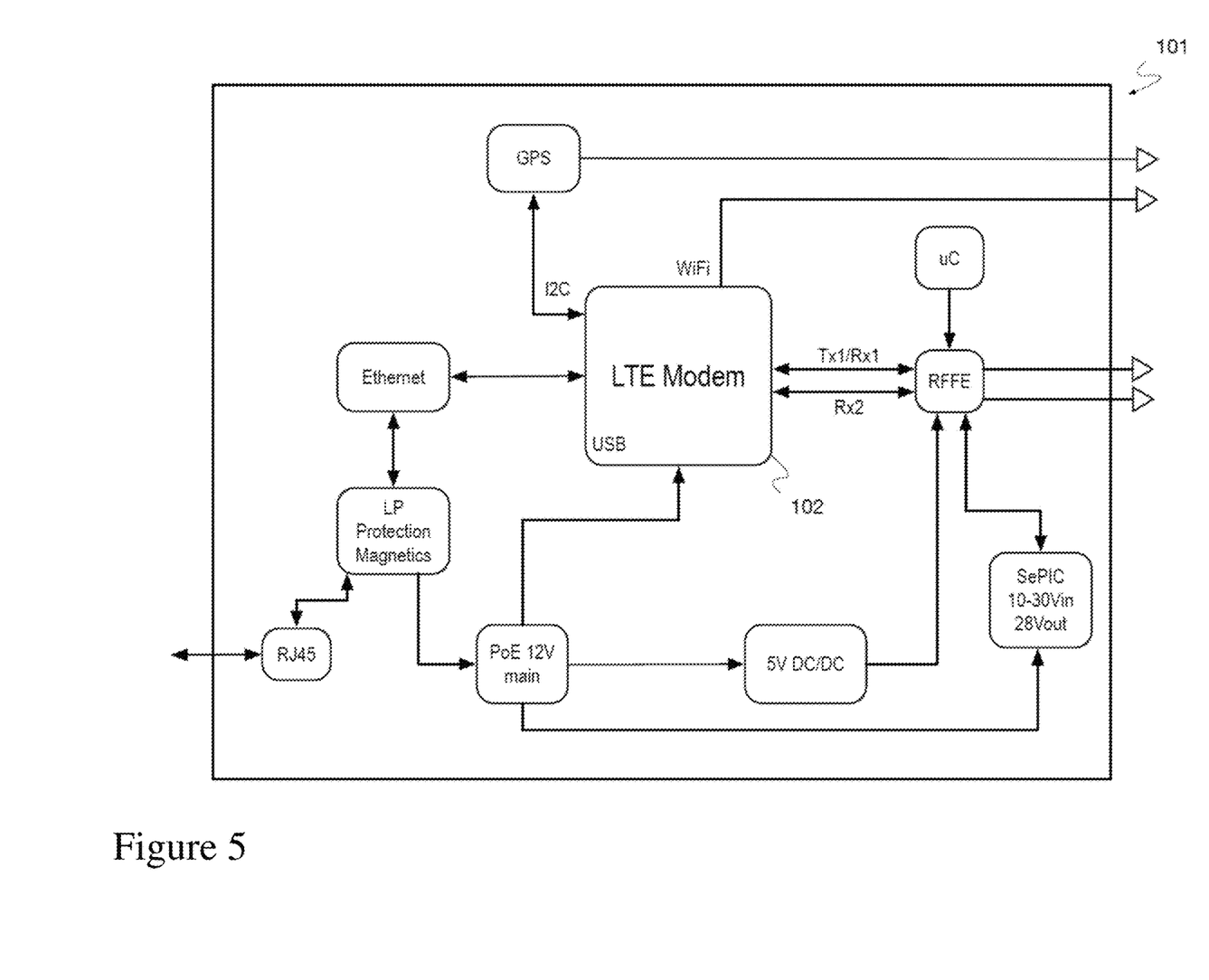
FIG. 5 depicts a block diagram of an electronic device with mobile router and HP RF front end supporting embodiments of the invention.

FIG. 5 illustrates an embodiment of a device with the HPUE 101 is housed in the same enclosure as an LTE modem/mobile router (UE) 102, and other hardware with which it shares power supplies. In this embodiment RF interconnects with co-located equipment is minimized. Examples of this embodiment includes outdoor HPUE boxes with integrated omnidirectional antennas. The integration of a mobile router 102 and HP RF front end 101 in one enclosure simplifies the installation on a roof of a police cruiser, small boat, or emergency vehicle that has ruggedized laptop mounted inside the vehicle. The Ethernet connection supports Power over Ethernet (PoE) and may be used to power the device. The LTE modem 102 is connected to the RF front end (RFFE) 101 through a Tx1/Rx1 and Rx2 RF connection. The RFFE is an HPUE device 101 controlled and configured using a micro controller. The HPUE interface communicates with a cellular BS 103 through a MIMO antenna. The LTE modem also supports Wi-Fi communications and communicates with a GPS module through an I²C or other serial bus. The LTE modem also connects to an Ethernet interface. The enclosure may communicate with vehicle or collocated computer hardware over wired Ethernet. Power is received using PoE protocols with supply 12V to the device. This power is converted within the device into voltages need by the device to operate. This embodiment may be used with a variety of antenna styles and shapes such as flat panel antennas and be using in fixed installations such as remote residences, oil & gas and mining facilities, rail cars, ships, military applications, and others.

Figure 6:
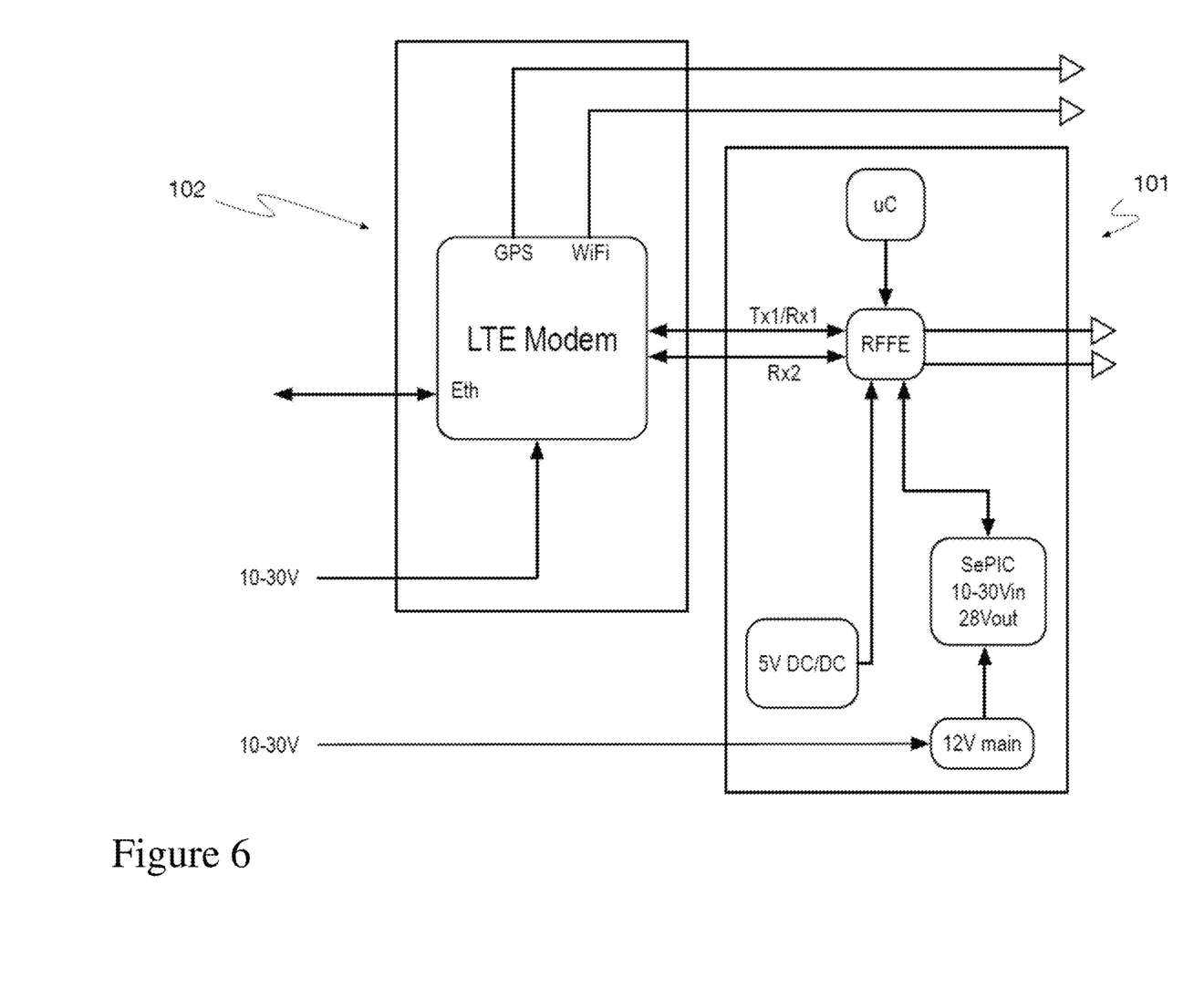
FIG. 6 depicts a block diagram of an electronic device with mobile router and HP RF front end supporting other embodiments of the invention.

FIG. 6 illustrates an embodiment of a device where the HPUE 101 is housed in its own enclosure with its own power supply. The HPUE 101 is then connected to an LTE modem 102 in close proximity, using short RF jumpers. Examples of this include mobile routers 102 in a vehicle or enclosure. The LTE modem 102 is then connected to other devices over Ethernet. The LTE modem 102 is housed in its own enclosure and supports Wi-Fi communications and communicates with a GPS module through an I²C or other serial bus. The LTE modem 102 also connects to an Ethernet interface to external devices. The LTE modem 102 is connected to the RFFE 101 through short RF cables. The RFFE is connected to a Tx1/Rx1 and Rx2 RF connection to an antenna that may be on a vehicle roof, or pole. The RFFE is an HPUE device 101 controlled and configured using a micro controller. The HPUE 101 interface communicates with a cellular BS 103 through a MIMO antenna. Power is received externally and converted within the devices into voltages need by the device to operate.

Figure 7:
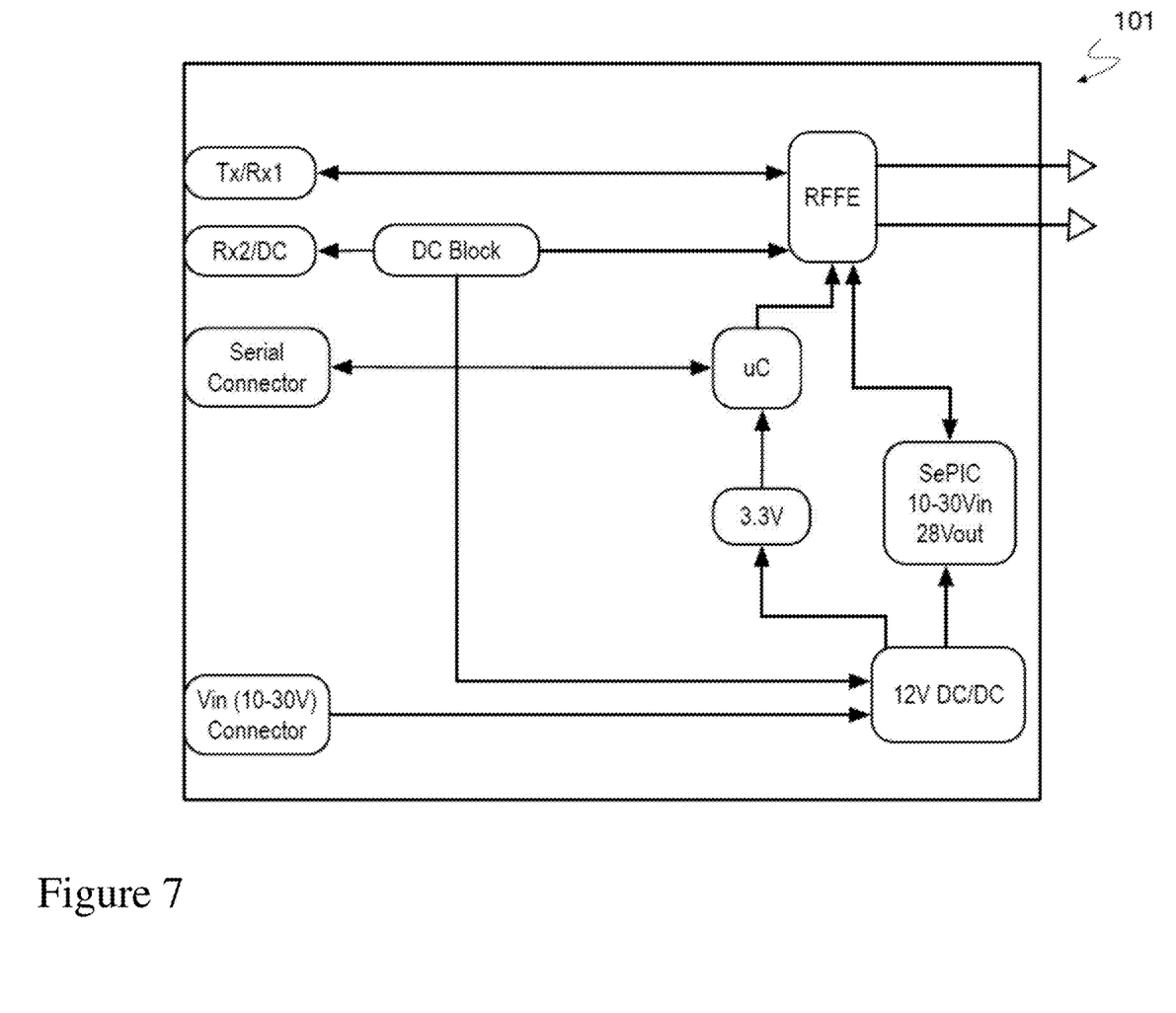
FIG. 7 depicts a block diagram of an analog RF front end supporting further embodiments of the invention.

FIG. 7 illustrates an embodiment of a device where the HPUE 101 takes the form of an analog RFFE 101 housed in its own enclosure with its own power supply. The RFFE 101 is connected to a Tx1/Rx1 and Rx2 RF connection to an antenna that may be on a vehicle roof, or pole. The HPUE 101 interface communicates with a cellular BS 103 through a MIMO antenna. The RFFE 101 is also connected to a co-located LTE device 102 through corresponding Tx/Rx1 and Rx2/DC RF connections. The RFFE 101 is controlled and configured using a micro controller which communicates to external devices over a serial connector or other means as known in the art. Power is received externally and converted within the devices into voltages need by the device to operate. This embodiment provides an analog RFFE 101 that may be used with any standard mobile router 102 or UE solution 102 to boost the performance of the UE 102. This embodiment may be retrofitted to existing installations. This method further enhances the performance of existing devices which are lacking any advanced antenna beamforming capabilities without the need for any hardware or software updates of these devices themselves. The micro controller's serial connection may be used to communicate environmental conditions such as temperature, operating parameters such as current consumption, setting such as RFFE 101 gain, and control information such as turning the analog RFFE 101 on and off. The serial connection may support industry standard commands such as AT commands that allow for the access and control of the device.

Embodiments of the invention may be combined with a smart antenna as outlined in U.S. Pat. No. 8,548,516, hereby incorporated by reference. A smart antenna comprises a multi beam antenna subsystem coupled to a control subsystem. The antenna comprises multiple, independent antennas that can be controlled to do beam-steering and beam-forming. The control subsystem is the controller of the smart antenna system and commands, controls, co-ordinates and manages the operation of the antenna subsystem. The controller may either be integral to the smart antenna or commands may be received from an external controller, such as an HPUE device. The controller selects one or several beams and allocates them to specific channels or physical regions. The selective use of beams may be used to reduce or eliminate interference between channels. The use of beams may also be used to provide omnidirectional coverage.

In the process of transmitting and receiving information the smart antenna is able to obtain and calculate a number of communications parameters. These include signal quality measures such as signal to noise ratio (SNR) and signal to interference and noise ratio (SINR). The smart antenna may also collect data on base station operating capacity and base station load or utilization. The smart antenna may also perform scanning of combinations of base stations, channels and beams. It establishes test links to base stations with different channels and beams and performs analysis of results obtained from these test links to select the best combination of base station, channel and beam. Communications parameter data is used by an integrated controller and may be sent to a controller located in an HPUE device.

Furthermore, the smart antenna can use geo-location and other location services to determine the location of a mobile or nomadic device relative to base-stations and to select the subset of the available channels and beams to optimize communications between mobile end points at their present location or at an estimated future location. Examples of positional and motion information include velocity of the device, acceleration of the device, direction of travel of the device, orientation of the device, angular velocity of the device, angular acceleration of the device and altitude of device. Location can be established dynamically or by using historical information.

In embodiments of the invention, the HPUE device may be coupled to a smart antenna as described herein, with the smart antenna replacing the MIMO antenna of FIG. 1. On power-up or periodically the smart antenna may start up in omni-directional mode and measure signal levels before optimizing the smart antenna parameters. LTE devices will transmit at a higher power if it determines that the base station is further away. The HPUE device 101 monitors the Tx power of the LTE device 102 and uses this to estimate the distance to the base station. The smart antenna can then be controlled to select an optimal beam or combination of beams with an optimal smart antenna configuration being when the LTE device's Tx power is at a minimum. Alternatively, information from the smart antenna may also be used to speed up the optimization process or make it more accurate.

Another method involves using an RSSI indicator from the HPUE 101. The LTE band used by the LTE device 102 is determined by the "home" network provider of the device. The LTE band is not known to the HPUE 101 device as its use is transparent to the LTE device. The HPUE may control the smart antenna to obtain both a high RSSI, Rx signal strength and a low Tx power from the LTE device, independent of the band being used.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

What is claimed is:

1. A wireless device comprising:
   a transmit chain coupled via at least one wired connection to a user equipment (UE), receiving over the at least one wired connection a transmit signal transmitted over the at least one wired connection by the UE according to a wireless protocol, the UE limited to transmit the transmit signal at or below a first output power limit of the wireless protocol, the transmit chain amplifying the transmit signal by a transmit gain to produce an amplified transmit signal, the amplified transmit signal being transmitted wirelessly to a base station (BS) at or below a second output power limit of the wireless protocol, the second output power limit greater than the first output power limit, the transmit chain comprising a transmit variable attenuator and a power amplifier;
   a receive chain coupled via the at least one wired connection to the UE, wirelessly receiving a receive signal from the BS, the receive chain amplifying the receive signal by a receive gain to produce an amplified receive signal, the amplified receive signal being transmitted over the at least one wired connection by the receive chain according to the wireless protocol and received over the at least one wired connection by the UE, the receive chain comprising a low noise amplifier and a receive variable attenuator, and
   a controller for controlling the transmit variable attenuator and the receive variable attenuator to balance the transmit gain and the receive gain.

2. The wireless device of claim 1, wherein the transmit signal and the amplified receive signal utilize a UE shared antenna and the amplified transmit signal and the receive signal utilize a BS shared antenna.

3. The wireless device of claim 2, further comprising a second receive chain coupled via the at least one wired connection to the UE, wirelessly receiving a second receive signal from the B S, the second receive chain amplifying the second receive signal by a second receive gain to produce a second amplified receive signal, the second amplified receive signal being transmitted over the at least one wired connection by the second receive chain according to the wireless protocol and received over the at least one wired connection by the UE, wherein the transmit gain and the second receive gain are balanced.

4. The wireless device of claim 3, wherein the UE operates on Long-Term Evolution (LTE) bands 14, 17, or 28.

5. The wireless device of claim 3, wherein the wireless device is a 3rd Generation Partnership Project (3GPP) class 1 compliant device; and the UE is a 3GPP class 3 device.

6. The wireless device of claim 3, wherein the wireless device utilizes a multiple input and multiple output (MIMO) antenna to communicate with the BS.

7. The wireless device of claim 6, wherein the MIMO antenna is a smart antenna, a power level of the transmit signal being used to control a configuration of the smart antenna.

8. The wireless device of claim 6, wherein the MIMO antenna is a smart antenna, a power indicator of the smart antenna being used to control a configuration of the smart antenna.

9. The wireless device of claim 3, further comprising a second transmit chain receiving a second transmit signal from the UE, the second transmit chain amplifying the second transmit signal by a second transmit gain to produce a second amplified transmit signal, the second amplified transmit signal being transmitted wirelessly to the BS, wherein the transmit gain and the second transmit gain are balanced.

10. The wireless device of claim 1, wherein the controller utilizes temperature compensated settings to control the transmit variable attenuator and the receive variable attenuator.

11. A method of extending the reach of user equipment (UE) in a wireless communication network, the method comprising:
   receiving over at least one wired connection a transmit signal transmitted over the at least one wired connection by the UE according to a wireless protocol, the UE limited to transmit the transmit signal at or below a first output power limit of the wireless protocol;
   amplifying the transmit signal by a transmit gain to produce an amplified transmit signal;
   wirelessly transmitting the amplified transmit signal to a base station (BS) at or below a second output power limit of the wireless protocol, the second output power limit greater than the first output power limit;
   wirelessly receiving a receive signal from the BS;
   amplifying the receive signal by a receive gain balanced with the transmit gain to produce an amplified receive signal; and
   transmitting over the at least one wired connection according to the wireless protocol the amplified receive signal for receipt to the UE over the at least one wired connection by the UE.

12. The method of claim 11, wherein the transmit signal and the amplified receive signal utilize a UE shared antenna and the amplified transmit signal and the receive signal utilize a BS shared antenna.

13. The method of claim 12, further comprising:
wirelessly receiving a second receive signal from the BS;
amplifying the second receive signal by a second receive gain balanced with the transmit gain to produce a second amplified receive signal; and
transmitting over the at least one wired connection according to the wireless protocol the second amplified receive signal for receipt over the at least one wired connection by the UE.

14. The method of claim 13, wherein the UE operates on Long-Term Evolution (LTE) bands 14, 17, or 28.

15. The method of claim 13, wherein the second power limit is a 3rd Generation Partnership Project (3GPP) class 1 compliant device power limit; and the UE is a 3GPP class 3 device.

16. The method of claim 13, wherein said wirelessly transmitting and receiving to and from the BS utilizes a multiple input and multiple output (MIMO) antenna to communicate with the BS.

17. The method of claim 13, further comprising:
receiving a second transmit signal from the UE;
amplifying the second transmit signal by a second transmit gain balanced with the transmit gain to produce a second amplified transmit signal; and
wirelessly transmitting the second amplified transmit signal to the BS.

18. The method of claim 11, further comprising:
balancing the transmit gain and the receive gain utilizing temperature compensated settings.

* * * * *